(12) United States Patent
Fisher (10) Patent No.: US 11,452,062 B1
(45) Date of Patent: Sep. 20, 2022

(54) EDGE MODEL DETECTION AND MANAGEMENT FOR DISTRIBUTED DATA COLLECTION

(71) Applicant: Lytx, Inc., San Diego, CA (US)

(72) Inventor: Abraham Fisher, Haifa (IL)

(73) Assignee: Lytx, Inc., San Diego, CA (US)

( * ) Notice: Subject to any disclaimer, the term of this patent is extended or adjusted under 35 U.S.C. 154(b) by 46 days.

(21) Appl. No.: 17/018,881

(22) Filed: Sep. 11, 2020

(51) Int. Cl.
*H04W 64/00* (2009.01)
*G06F 16/9035* (2019.01)
*H04W 4/90* (2018.01)
*H04W 4/021* (2018.01)
*G06N 20/00* (2019.01)
*H04W 84/02* (2009.01)

(52) U.S. Cl.
CPC ...... *H04W 64/003* (2013.01); *G06F 16/9035* (2019.01); *G06N 20/00* (2019.01); *H04W 4/021* (2013.01); *H04W 4/90* (2018.02); *H04W 64/006* (2013.01); *H04W 84/02* (2013.01)

(58) Field of Classification Search
CPC ..... H04W 64/003; H04W 4/90; H04W 4/021; H04W 64/006; H04W 84/02; G06F 16/9035; G06N 20/00
See application file for complete search history.

(56) References Cited

U.S. PATENT DOCUMENTS

| | | | |
|---|---|---|---|
| 10,109,185 B1 | 10/2018 | Dubois, Jr. | |
| 10,997,423 B1 | 5/2021 | Borras | |
| 2013/0096731 A1 | 4/2013 | Tamari | |
| 2017/0066374 A1 | 3/2017 | Hoye | |
| 2017/0257602 A1* | 9/2017 | Axson | G08B 13/19689 |
| 2018/0341706 A1* | 11/2018 | Agrawal | G06K 9/00758 |
| 2019/0042900 A1* | 2/2019 | Smith | G06T 7/11 |
| 2020/0027333 A1 | 1/2020 | Xu | |
| 2020/0073969 A1 | 3/2020 | Kursar | |
| 2020/0082188 A1 | 3/2020 | Singh | |
| 2021/0035442 A1 | 2/2021 | Baig | |
| 2021/0122292 A1 | 4/2021 | Javeri | |

* cited by examiner

*Primary Examiner* — Umair Ahsan
(74) *Attorney, Agent, or Firm* — Van Pelt, Yi & James LLP (57) ABSTRACT

The system includes a device database, an interface, and a processor. The device database stores a set of times and corresponding set of locations associated with a device. The interface is configured to receive a request for identification of sensor data associated with a target. The request includes a request time and/or a request location. The processor is configured to: determine a set of devices associated with the time and/or the location using the device database; provide a request to search for the sensor data associated with the target at the time and/or the location to each device of the set of devices; and receive an indication of the identification of sensor data associated with the target from an identifying device of the set of devices.

19 Claims, 11 Drawing Sheets

EDGE MODEL DETECTION AND MANAGEMENT FOR DISTRIBUTED DATA COLLECTION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event (e.g., a sudden stop, a hard maneuver, a collision, etc.). A vehicle event recorder with modern hardware is typically able to continuously record sensor data (e.g., for a few sensors) and store it for long periods of time (e.g., one or more months). When data recorded by the vehicle event recorder is desired for analysis at a central server system, typically the vehicle event recorder provides the data for analysis via a network connection and the data is analyzed—for example, by the central server system, by a cloud system, etc. Costs for data transfer can be very high, reducing the ability of the vehicle event recorder to upload data and limiting the number and types of analysis performed, creating a problem where the full value of the data is not realized.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for identification is disclosed. The system comprises a device database, an interface, and a processor. The device database stores a set of times and corresponding set of locations associated with a device. The interface is configured to receive a request for identification of sensor data associated with a target, wherein the request includes a request time and/or a request location. The processor is configured to determine a set of devices associated with the time and/or the location using the device database, provide a request to search for the sensor data associated with the target at the time and/or the location to each device of the set of devices, and receive an indication of the identification of sensor data associated with the target from an identifying device of the set of devices.

A system for identifying a target given a place and/or a time comprises a system for executing processing algorithms on a vehicle event recorder system. A vehicle event recorder system comprises a computing system mounted on a vehicle and coupled to a set of sensors—for example, video recorders, audio recorders, accelerometers, gyroscopes, vehicle state sensors, a global positioning system (GPS), etc. As the vehicle drives (e.g., following its daily route, conducting business, etc.) sensor data—for example, video data—is captured and stored using a large capacity data storage coupled to the vehicle event recorder. The sensor data then can be accessed at a later time for further analysis. Typically, the sensor data is stored associated with a time data, location data, or other identifying data in order to locate desired sensor data after storage. A vehicle event recorder in communication with a system for identifying a target provides regular time and location updates (e.g., once a second, once every 5 seconds, once every 10 seconds, once every 30 seconds, once a minute, once every 10 minutes, etc.) to the system for identifying a target. The system for identifying a target stores the data from the time and location updates associated with a device identifier identifying the device in a device database.

The system for identifying a target utilizes a set of detectors (e.g., target detecting algorithms—for example, machine learning algorithms, machine vision algorithms, neural network algorithms, artificial intelligence algorithms, etc.) for analyzing stored video data to identify targets. For example, a person detector comprises an algorithm trained to analyze video data and identify people. The system for identifying a target receives a request to identify sensor data associated with a target, wherein the request includes a request time and/or a request location. For example, the request includes a request time (e.g., find sensor data indicating a person at 7:00 PM on Aug. 31, 2020), a request time range (e.g., find sensor data indicating a car between 8:00 AM and 8:15 AM on Aug. 16, 2020), a request location (e.g., find sensor data indicating a green van at 45° 30' 55.0" N 122° 40' 37.8" W), a request location range (e.g., find sensor data indicating a fast food restaurant within an indicated geofence region, find sensor data indicating a car on fire within 200 feet of 40° 45' 7.8" N 73° 58' 39.6" W, find sensor data indicating a red sports car within the state of Delaware), or a combination of a request time or time range and location or location range. The system for identifying a target queries the device database using the request time and/or location and receives a set of device identifiers, each device identifier associated with time and location data in the device database matching the request time and/or location. For example, a query to the device database for devices located at 38° 54' 4.6" N 77° 2' 11.6" W on Aug. 13, 2020 returns device identifiers associated with all devices that provided a time and location update indicating that time and location. For example, determining whether a device update indicates a request time and a request location comprises determining whether a device update location is less than or equal to a threshold distance from the request location at a device update time less than or equal to a threshold time from the request time.

The system for identifying a target determines a detector associated with the target. For example, a detector is used by a device to identify stored sensor data associated with the target. The system for identifying a target stores a catalog of detectors—for example, detectors associated with standard search targets. The system for identifying a target additionally can receive new detectors, in the event a user desires to identify sensor data associated with a target that is not already associated with a detector, or in the event a new and improved detector is designed. A detector associated with a target is determined according to a keyword (e.g., a target keyword is supplied by a user and mapped to a detector using a keyword detector mapping), directly by a user (e.g., a user selects a keyword from a stored set of keywords using a user interface), using an artificial intelligence algorithm (e.g., a user inputs a text description of a desired target and the text description is analyzed using an artificial intelligence algorithm to determine a detector of a stored and/or accessible set of detectors). A detector database is utilized to determine whether the detector associated with the target is stored by the devices identified using the device database as having provided a location update matching the request. For example, devices typically store a subset of all available detectors. Devices are initially supplied with a basic set of zero or more commonly used detectors, and when a request for data identification is to be executed by the device utilizing a detector not already stored, the detector is provided to the device by the system for identifying a target. The system for identifying a target stores the detector database indicating which detectors are stored by which devices. Once a set of devices is identified by the device database and a detector is selected, the detector database is utilized to determine whether the devices already store the detector. The detector is provided to each device determined to not already store the detector. The device is then provided instructions to analyze its stored data over a time range corresponding to the request time range using the detector. In the event the detector reports a target identification, an indication is provided to the system that sensor data associated with the target was found. The system for identifying a target can then request the sensor data if desired. In some embodiments, the system for identifying a target additionally performs further analysis on the sensor data or requests further analysis to be performed (e.g., on the cloud). Further analysis comprises identification of additional targets, higher resolution identification, data filtering or other processing, etc.

The system for identifying a target improves the computer or system by distributing data analysis to a set of recording devices, which utilizes modular detectors. Data identification is performed on the devices and only data identified by a detector as data of interest is uploaded, allowing extensive data processing to be performed while minimizing data transfer bandwidth.

Figure 1:
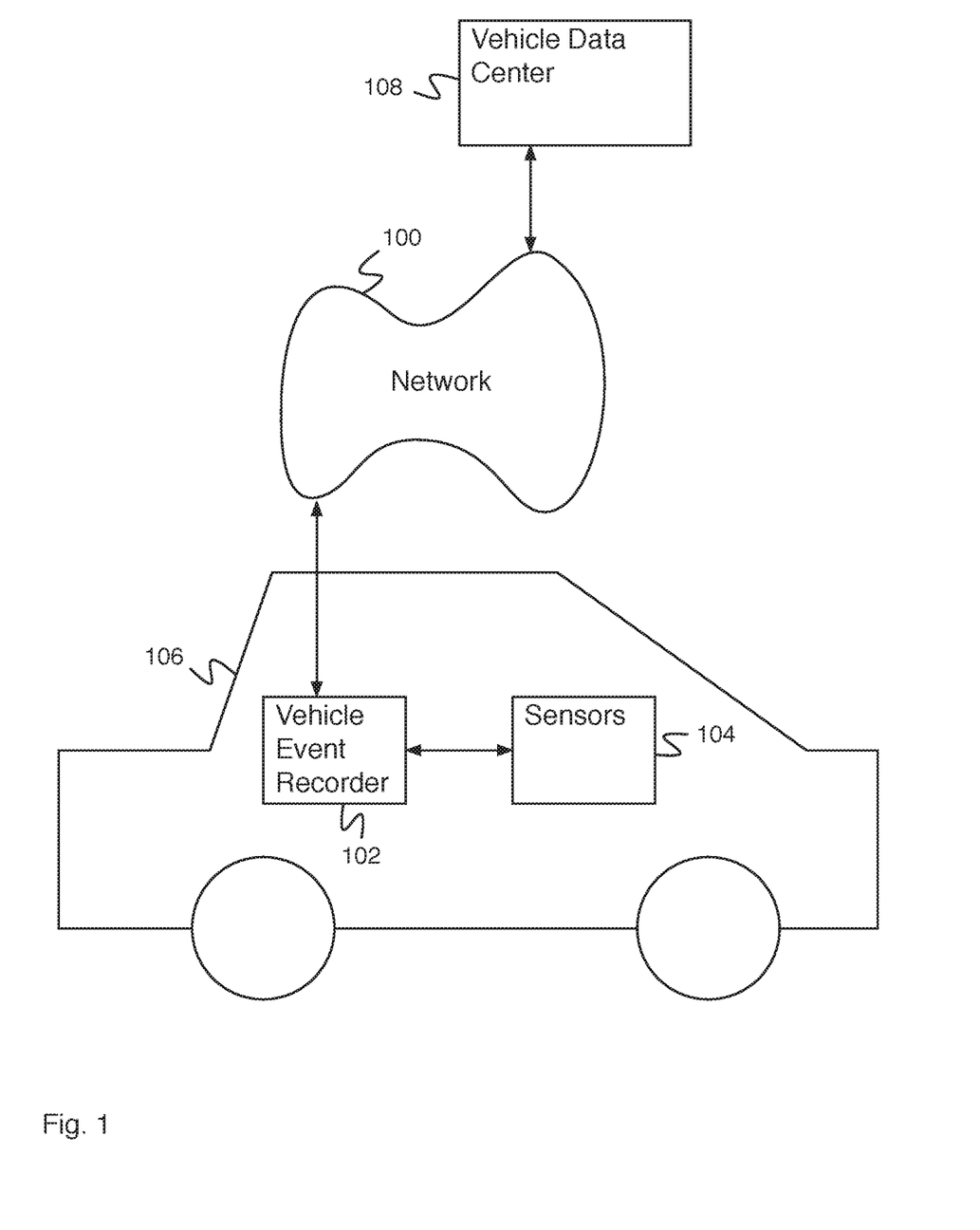
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system (ADAS) sensors, a GPS, outdoor temperature sensors, moisture sensors, line tracker sensors (e.g., laser line tracker sensors), a lane change sensor, etc. Vehicle state sensors comprise internal vehicle state sensors—for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components.

Vehicle event recorder 102 comprises a communications system for communicating with network 100. Network 100 comprises a network for communications. Network 100 comprises one or more of a wireless network, a wired network, a cellular network, a 5G network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night).

Vehicle event recorder 102 communicates with vehicle data center 108 via network 100. Vehicle data center 108 comprises a remote server for data storage, data analysis, data access by a coach and/or manager, data review by a human reviewer, etc. For example, vehicle data center 108 comprises a system for identification, comprising a device database, wherein the device database stores a set of times and a corresponding set of locations associated with a device, an interface configured to receive a request for identification of sensor data associated with a target, wherein the request includes a request time and/or a request location, and a processor configured to determine a set of devices associated with the time and/or the location using the device data, provide a request to search for the sensor data associated with the target at the time and/or the location to each device of the set of devices, and receive an indication of the identification of sensor data associated with the target from an identifying device of the set of devices.

Figure 2:
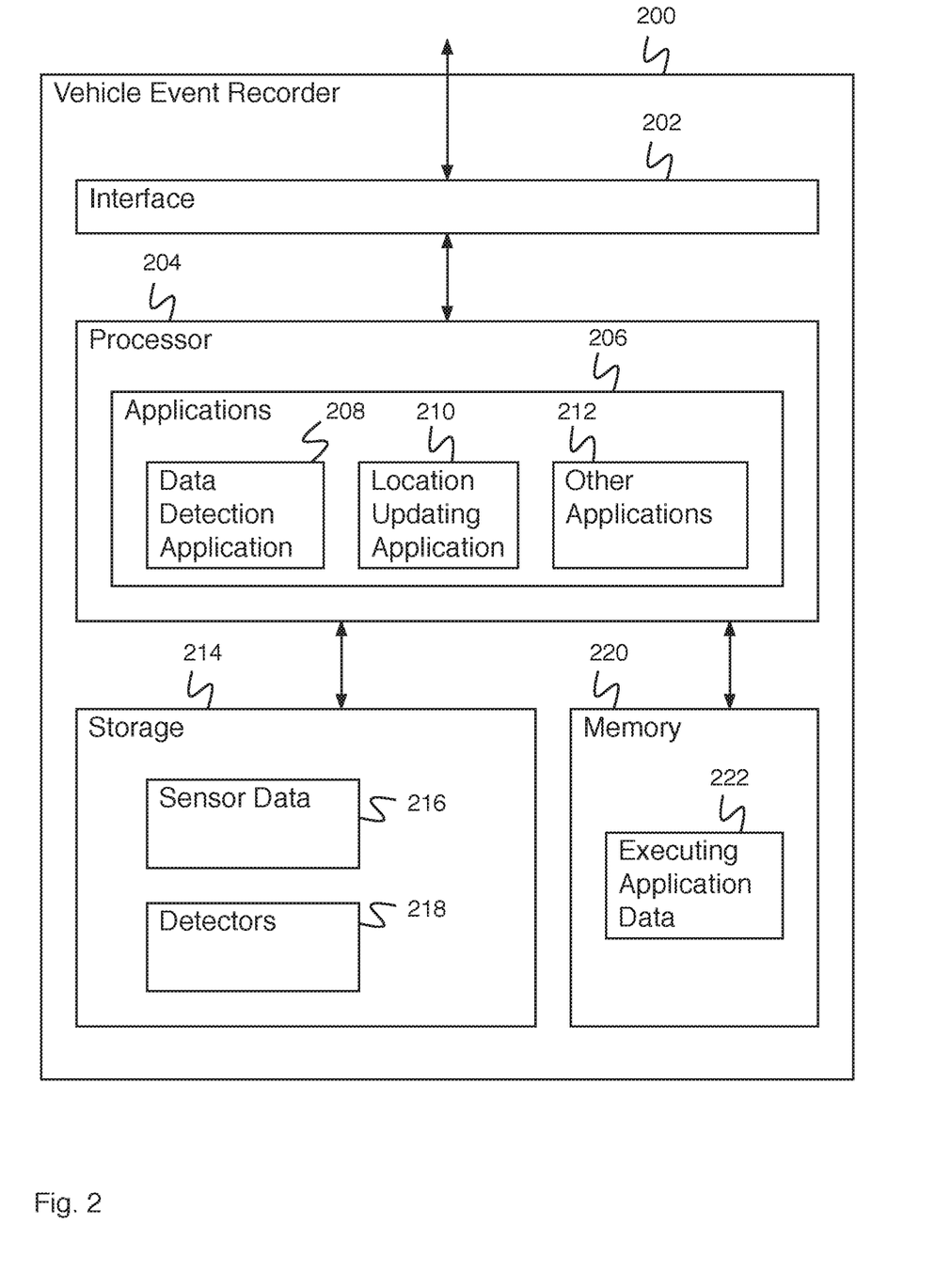
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. For example, vehicle event recorder 200 comprises one or more computers mounted in a vehicle (e.g., one or more computers communicating via a wired or wireless communication link). In the example shown, vehicle event recorder 200 comprises interface 202. For example, interface 202 comprises an interface for receiving sensor data, receiving a request to identify sensor data associated with a target, receiving network communications, receiving a detector, providing an indication of an anomalous event, providing sensor data, providing communications, providing an indication sensor data associated with a target was identified, etc. Processor 204 comprises a processor for executing applications 206. Applications 206 comprise data detection application 208, location updating application 210, and other applications 212. Data detection application 208 comprises an application for detecting sensor data associated with a target using a detector. For example, data detection application 208 comprises an application for applying a detector (e.g., a detector of detectors 218) to a sample of sensor data (e.g., of sensor data 216—for example, a sample of sensor data 216 recorded during a time range, a sample of sensor data recorded while within a location boundary, etc.) and determining whether the target was determined by the detector. Location updating application 210 comprises an application for providing a location update—for example, for providing location update data comprising a location, a time and a device identifier to a vehicle data center. Other applications 212 comprise any other appropriate applications (e.g., a communications application, a data storage and retrieval application, a web browser application, a user interface application, a data analysis application, etc.). Storage 214 comprises sensor data 216 (e.g., sensor data recorded by one or more sensors—for example, video data, audio data, GPS data, accelerometer data, etc.) and detectors 218 (e.g., detectors comprising target identification detectors, e.g., machine learning detectors, artificial intelligence detectors, neural network detectors, machine vision detectors, etc.). Memory 220 comprises executing application data 222 comprising data associated with applications 206.

Figure 3:
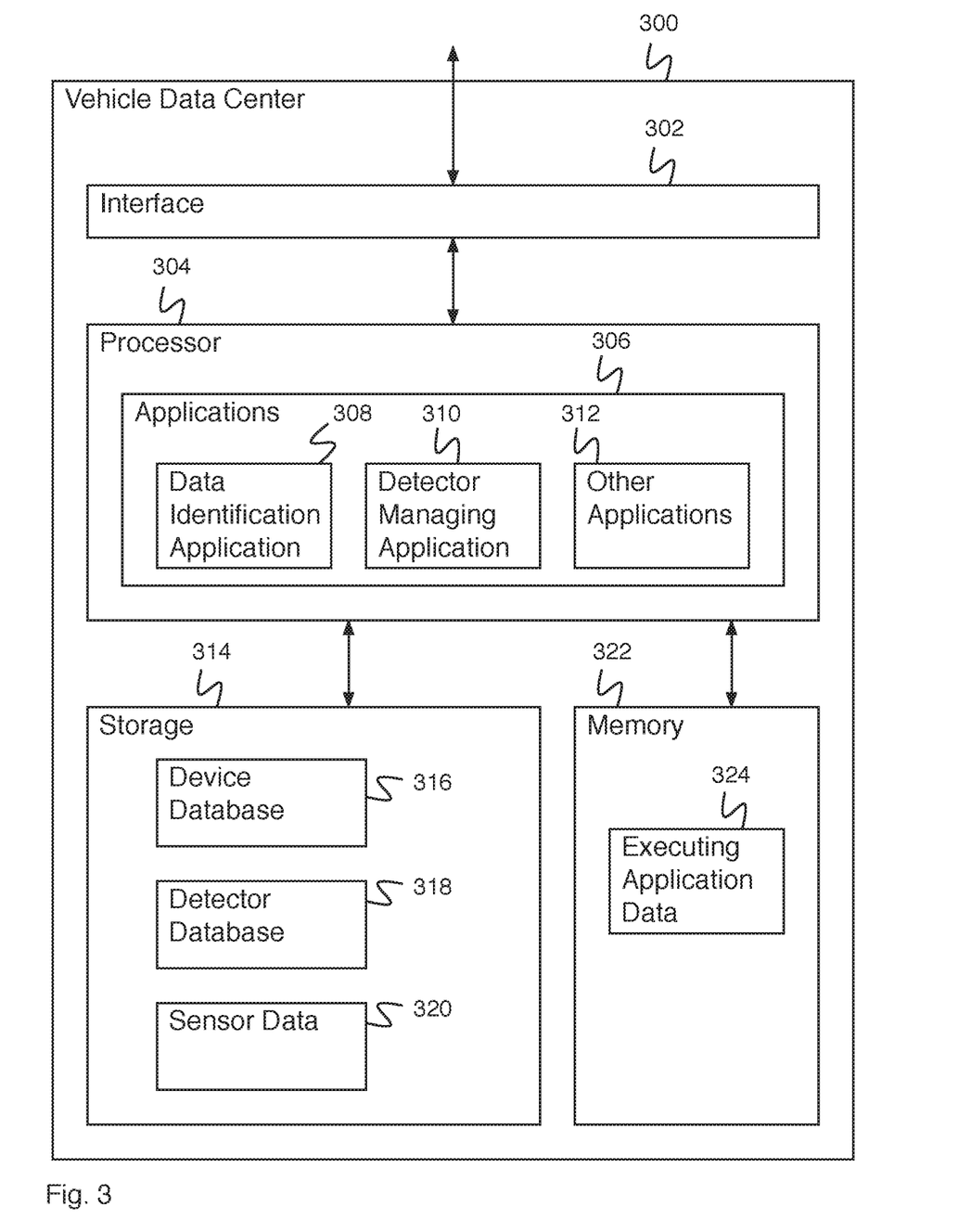
FIG. 3 is a block diagram illustrating an embodiment of a vehicle data center.

FIG. 3 is a block diagram illustrating an embodiment of a vehicle data center. In some embodiments, vehicle data center 300 comprises vehicle data center 108 of FIG. 1. In various embodiments, vehicle data center 300 comprises a computer, a networked set of computers, a cloud computing system, or any other appropriate vehicle data center system. In the example shown, vehicle data center 300 comprises interface 302. For example, interface 302 comprises an interface for receiving sensor data, receiving a location update, receiving a request to identify sensor data associated with a target, providing sensor data, providing a request for identification of sensor data associated with a target, wherein the request includes a request time and/or a request location, providing a detector, providing an indication that sensor data associated with a target has been found, etc. Processor 304 comprises a processor for executing applications 306. Applications 306 comprise data identification application 308, detector managing application 310, and other applications 312. Data identification application 308 comprises an application for identifying sensor data associated with a target. For example, data identification application 308 comprises an application for determining a set of devices associated with a time and/or a location using device database 316, providing a request to search for sensor data associated with a target at the time and/or the location to each device of the set of devices, and receiving an indication of the identification of sensor data associated with the target from an identifying device of the set of devices. Detector managing application 310 comprises an application for managing detectors, wherein managing detectors, comprises receiving a detector and storing it in detector database 318, determining a detector associated with a target, determining whether a detector is stored on a device, providing a detector to a device, etc. Other applications 312 comprise any other appropriate applications (e.g., a communications application, a data storage and retrieval application, a web browser application, a user interface application, a data analysis application, etc.). Storage 314 comprises device database 316 (e.g., a device database storing a set of times and a corresponding set of locations associated with a device—for example, storing data from a set of location updates received from one or more devices), detector database 318 (e.g., a detector database storing a list of detectors associated with a device), and sensor data 320 (e.g., sensor data received from a device—for example, sensor data determined by a device to be associated with a target). Memory 322 comprises executing application data 324 comprising data associated with applications 306.

Figure 4:
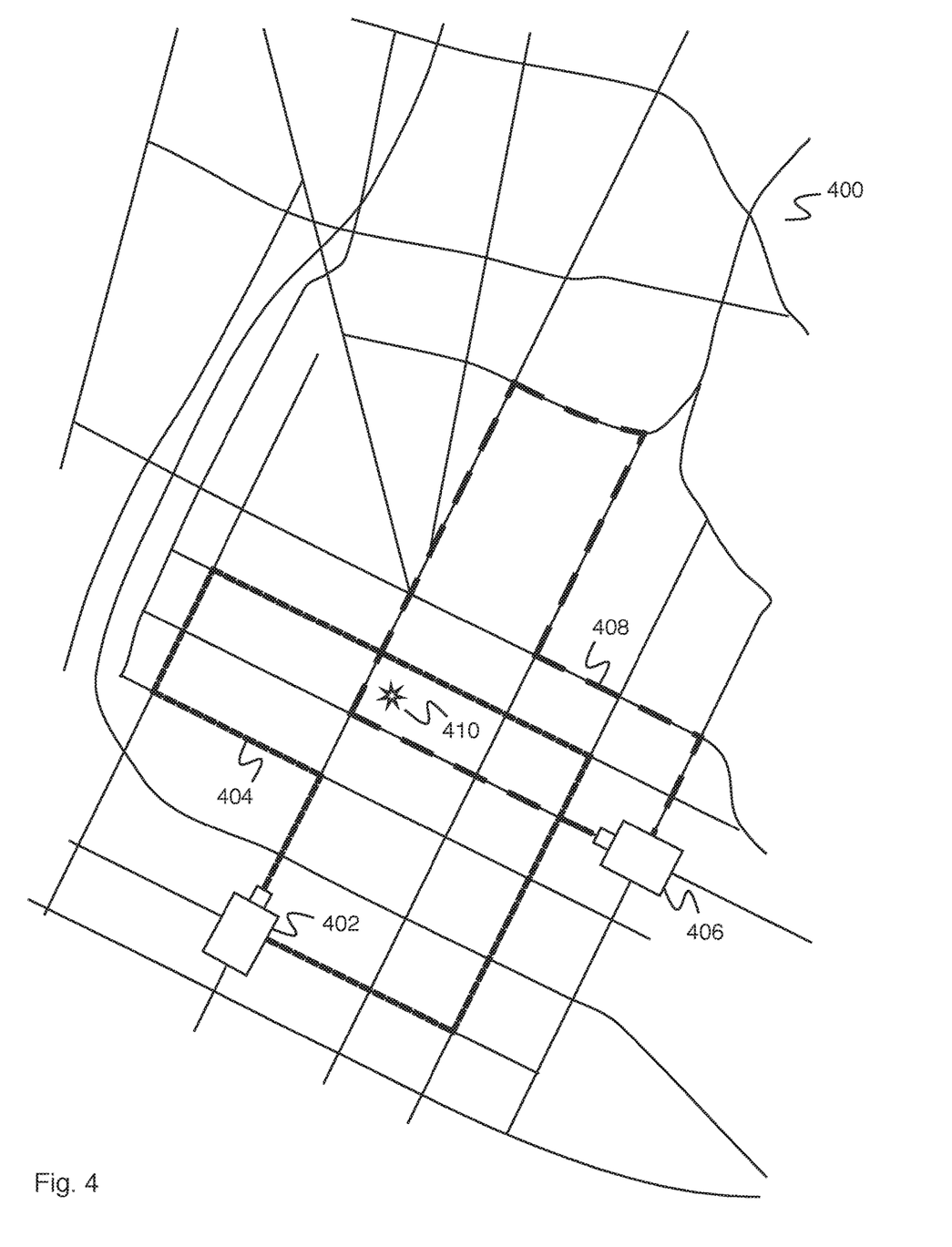
FIG. 4 is a diagram illustrating an embodiment of a map.

FIG. 4 is a diagram illustrating an embodiment of a map. In the example shown, map 400 comprises an area map including vehicle 402 following route 404 and vehicle 406 following route 408. Vehicle 402 and vehicle 406 each include a vehicle event recorder (e.g., vehicle event recorder 102 of FIG. 1). As vehicle 402 and vehicle 406 travel their routes, their vehicle event recorders capture and store data. Additionally, their vehicle event recorders provide location updates including location, time, and device identifier to a vehicle data center. Anomalous event 410 comprises an anomalous event—for example, a vehicle accident including a fire. Anomalous event 410 occurs at a known location at a known time (e.g., after the fact, it is known where and when the accident occurred). Both vehicle 402 and vehicle 404 passed anomalous event 410 (e.g., while it was occurring) in the course of their routes.

In the event a request is received by the vehicle data center to search for sensor data (e.g., video data) associated with anomalous event 410, the vehicle data center accesses its device database to determine vehicle event recorder devices that reported being near anomalous event 410 during the time range when it was occurring. Vehicle 402 and vehicle 404 are identified. The vehicle data center provides vehicle 402 and vehicle 404 an indication to analyze their stored data during the time period of anomalous event 410 using a detector for a vehicle accident including a fire. In the event sensor data capturing anomalous event 410 was successfully captured by the vehicle event recorder of vehicle 402 or vehicle 404, the identifying vehicle event recorder provides the sensor data to the vehicle data server.

Figure 5:
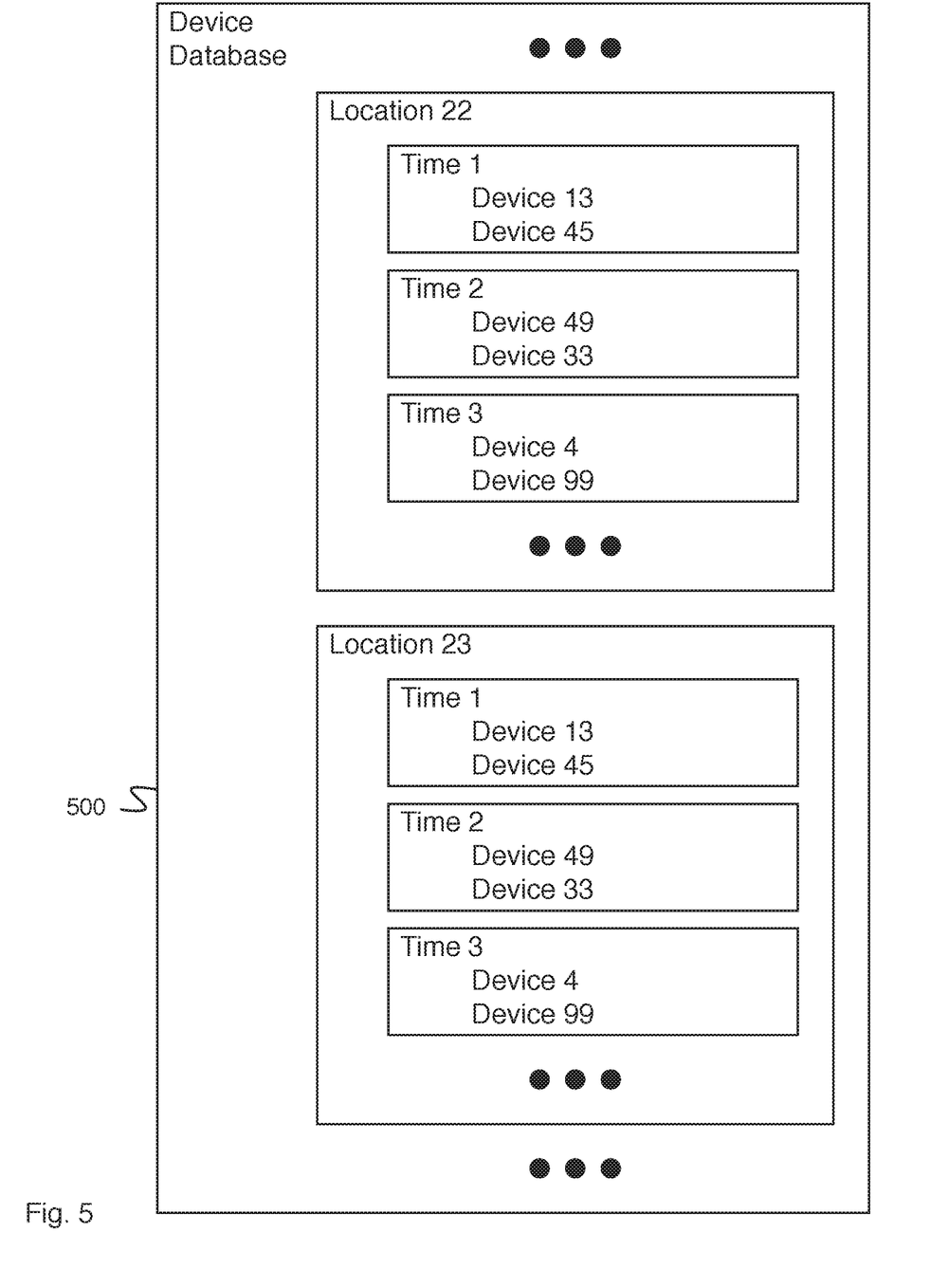
FIG. 5 is a diagram illustrating an embodiment of a device database.

FIG. 5 is a diagram illustrating an embodiment of a device database. In some embodiments, device database 500 comprises device database 316 of FIG. 3. In the example shown, device database 500 comprises a set of locations (e.g., comprising location 22, location 23, etc.). Each location stores a set of devices known to be at the location for a set of times (e.g., time 1, time 2, time 3, etc.). In various embodiments, the device database is structured with location at top-level, with time at top-level, using multiple structures, or in any appropriate way to allow access of a set of devices known to be at a given location at a given time.

Figure 6:
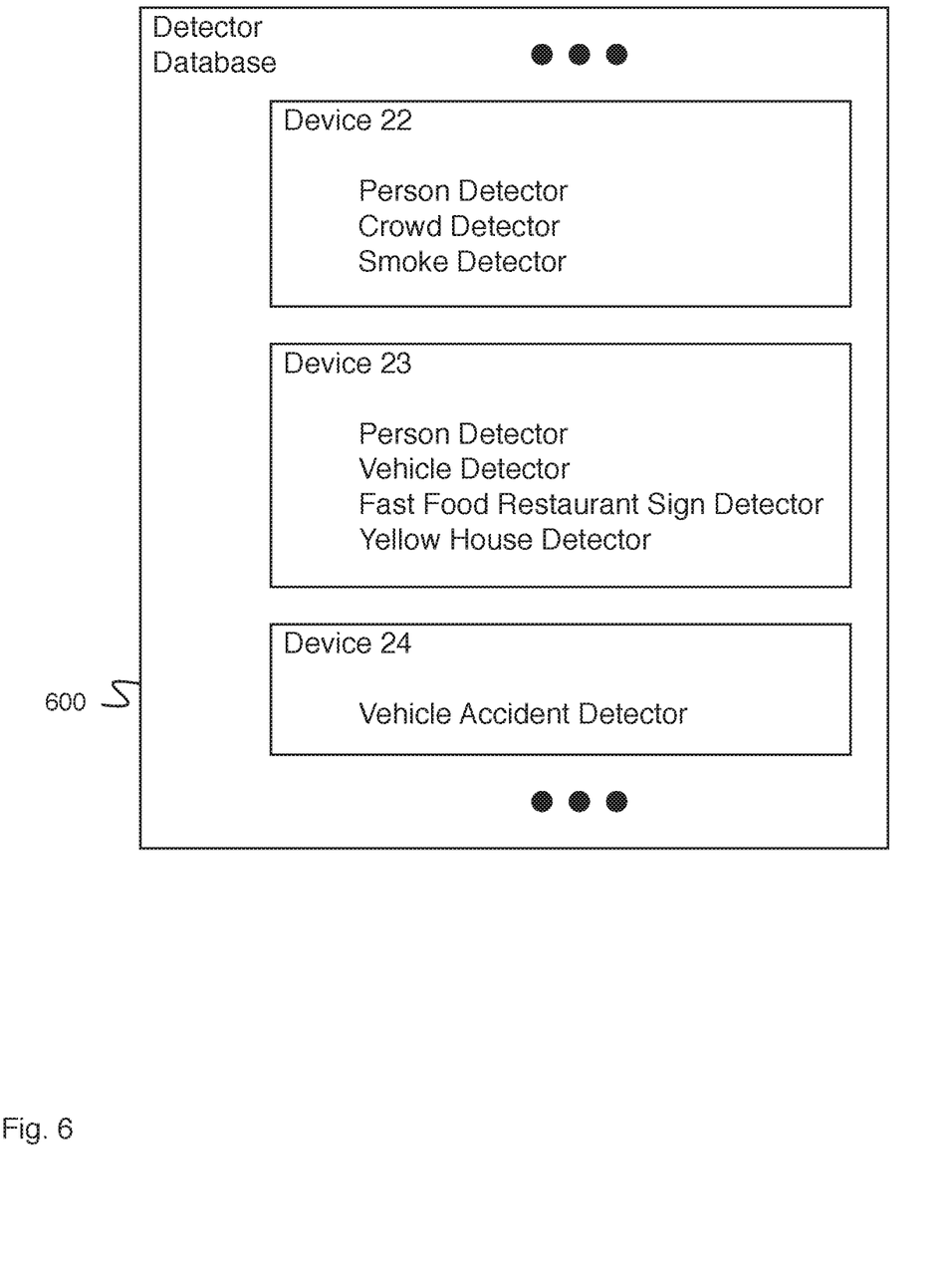
FIG. 6 is a diagram illustrating an embodiment of a detector database.

FIG. 6 is a diagram illustrating an embodiment of a detector database. In some embodiments, detector database 600 comprises detector database 318 of FIG. 3. In the example shown, detector database 600 comprises a set of devices (e.g., device 22, device 23, device 24, etc.) and a set of detectors (e.g., person detector, crowd detector, and smoke detector) known to be stored on the device. In various embodiments, detector database 600 is structured in any appropriate way to allow determination of a set of detectors stored on a device. For example, a detector of a set of detectors comprises a detector for a vehicle, a person, a crowd, a vehicle accident, a near accident, a building, smoke, a fire, an accident involving fire, a yellow house, panicked people, a fast food restaurant sign, or a specific-shaped vehicle (e.g., bullet shaped). For example, the detector comprises a machine learning algorithm, a neural network, a machine vision algorithm, or an artificial intelligence algorithm.

Figure 7:
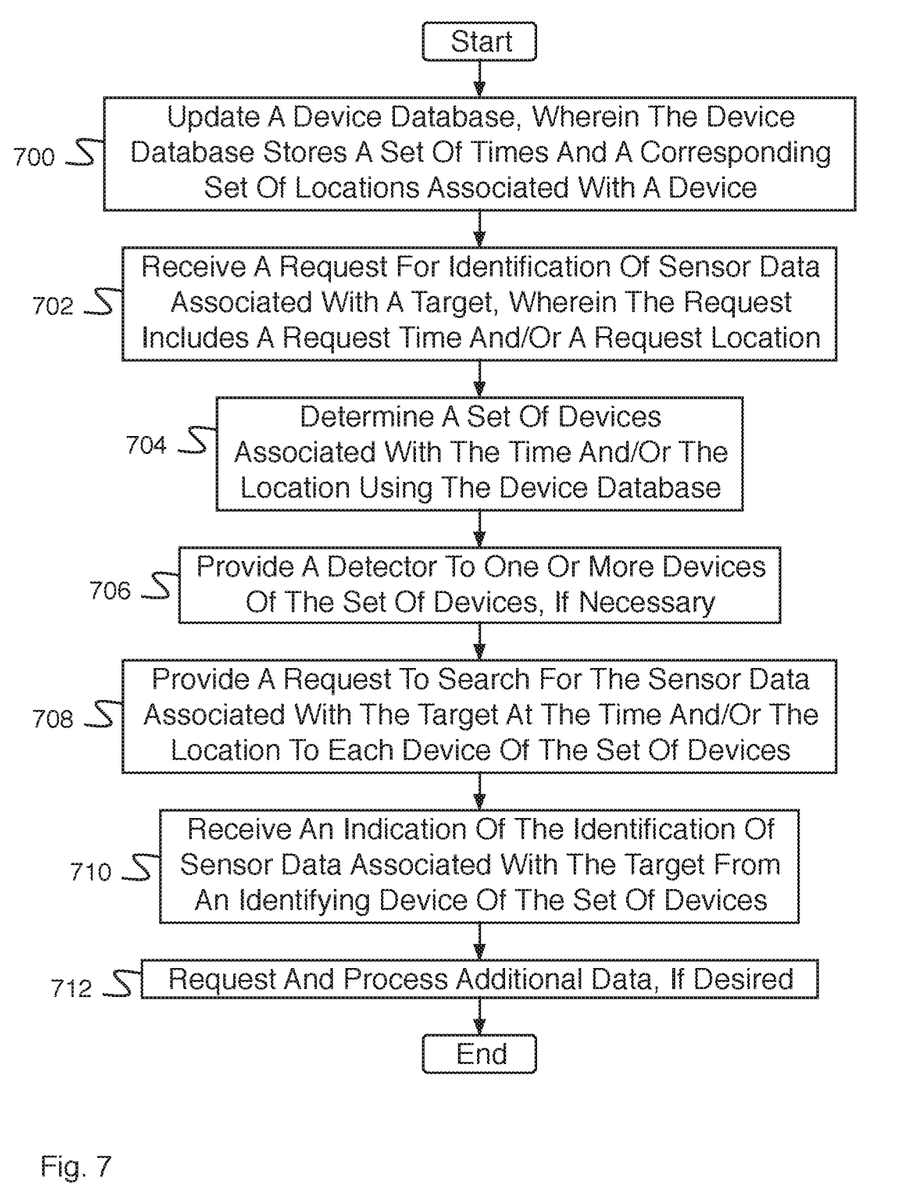
FIG. 7 is a flow diagram illustrating an embodiment of a process for identification.

FIG. 7 is a flow diagram illustrating an embodiment of a process for identification. In some embodiments, the process of FIG. 7 is executed by vehicle data center 108 of FIG. 1. In the example shown, in 700, a device database is updated, wherein the device database stores a set of times and a corresponding set of locations associated with a device. For example, a series of time/location pairs are stored in a device database associated with a device identifier for data received from a set of devices. In 702, a request for identification of sensor data associated with a target is received, wherein the request includes a request time and/or a request location. For example, the request time comprises a time or a time range and the request location comprises a location or a location area. For example, a location area comprises a geofence area (e.g., an area specified by a set of location coordinates delineating a closed region), a center coordinate and radius distance, everywhere, or a named area (e.g., Berkeley, Delaware, Alameda County, etc.). In the event the request does not include a request time, the request time is determined to be the time range comprising all time (e.g., there is no bound in time for identifying the target). In the event the request does not include a request location, the request location is determined to be an area comprising everywhere (e.g., there is no bound in locations for identifying the target). In 704, a set of devices associated with the time and/or the location is determined using the device database. For example, determining a set of devices associated with the time and/or the location comprises determining whether a device is at a location (e.g., is indicated in the device database to have been at) that is less than (or less than or equal to) a threshold distance from the request location at a time less than (or less than or equal to) a threshold time from the request time. In 706, a detector is provided to one or more devices of the set of devices, if necessary. For example, a software detector, algorithm, model weights, model, are provided to one or more devices of the set of devices. In 708, a request is provided to search for the sensor data associated with the target at the time and/or the location to each device of the set of devices. For example, a job request is sent to devices requesting identification of sensor data that is associated with or likely to be of a desired target. In 710, an indication of the identification of sensor data associated with the target is received from an identifying device of the set of devices. For example, data identified as likely to be of desired target is received from one or more of the devices that received the job. In some embodiments, the indication of the identification of sensor data associated with the target is received from a plurality of identifying devices (e.g., the detector identifies sensor data associated with the target on a plurality of devices).

Figure 8:
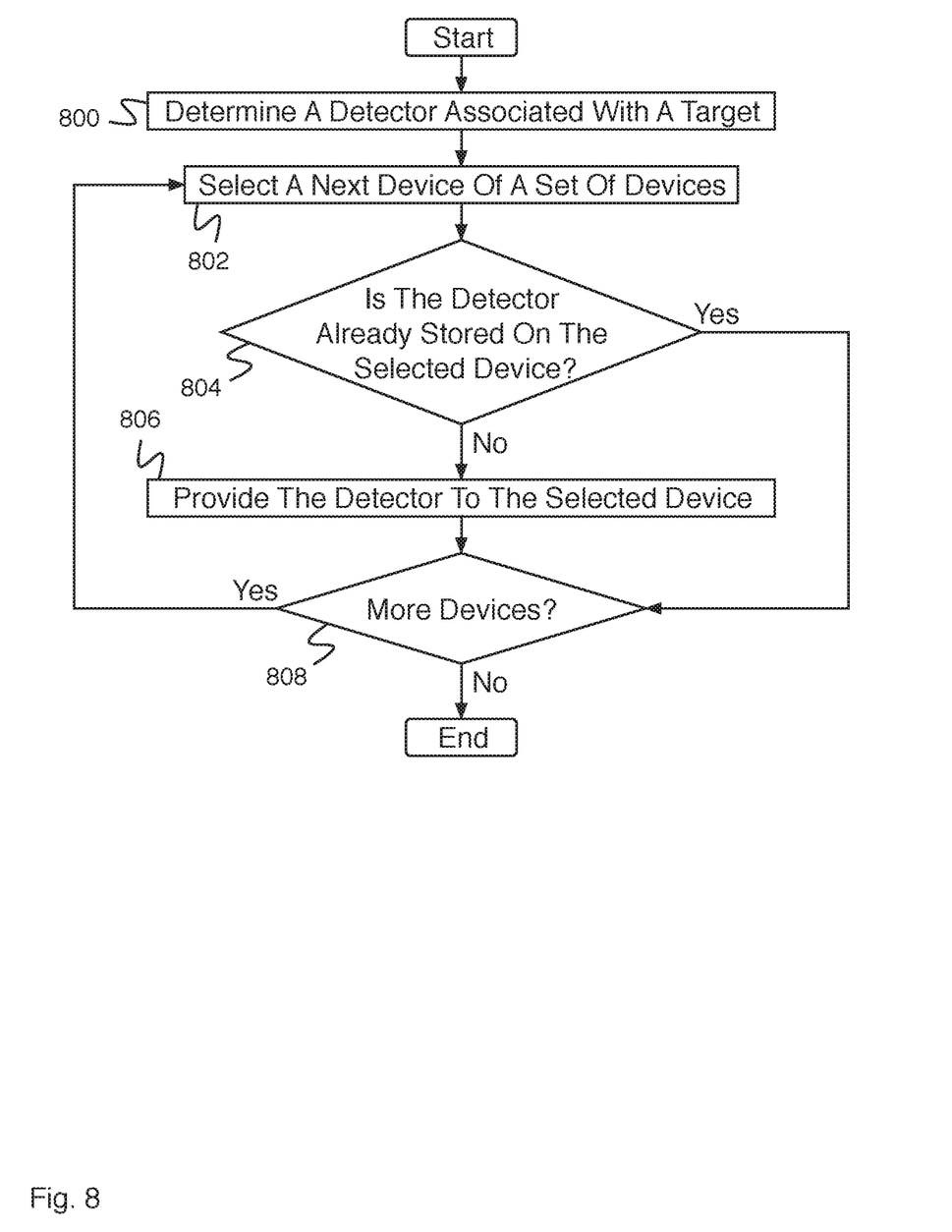
FIG. 8 is a flow diagram illustrating an embodiment of a process for providing a detector to one or more devices of a set of devices, if necessary.

FIG. 8 is a flow diagram illustrating an embodiment of a process for providing a detector to one or more devices of a set of devices, if necessary. In some embodiments, the process of FIG. 8 implements 706 of FIG. 7. In the example shown, in 800, a detector associated with a target is determined. For example, the detector is determined based on a user input, a keyword lookup, an artificial intelligence process, etc. In 802, a next device of a set of devices is selected. For example, the set of devices comprises a set of devices determined to be at a specified location at a specified time. In 804, it is determined whether the detector is already stored on the selected device. For example, it is determined whether the detector is already stored on the selected device using a detector database or by querying the selected device. In the event it is determined that the detector is already stored on the selected device, control passes to 808. In the event it is determined that the detector is not already stored on the selected device, control passes to 806. In 806, the detector is provided to the selected device. In 808, it is determined whether there are more devices (e.g., more devices of the set of devices). In the event it is determined that there are more devices, control passes to 802. In the event it is determined that there are not more devices, the process ends.

Figure 9:
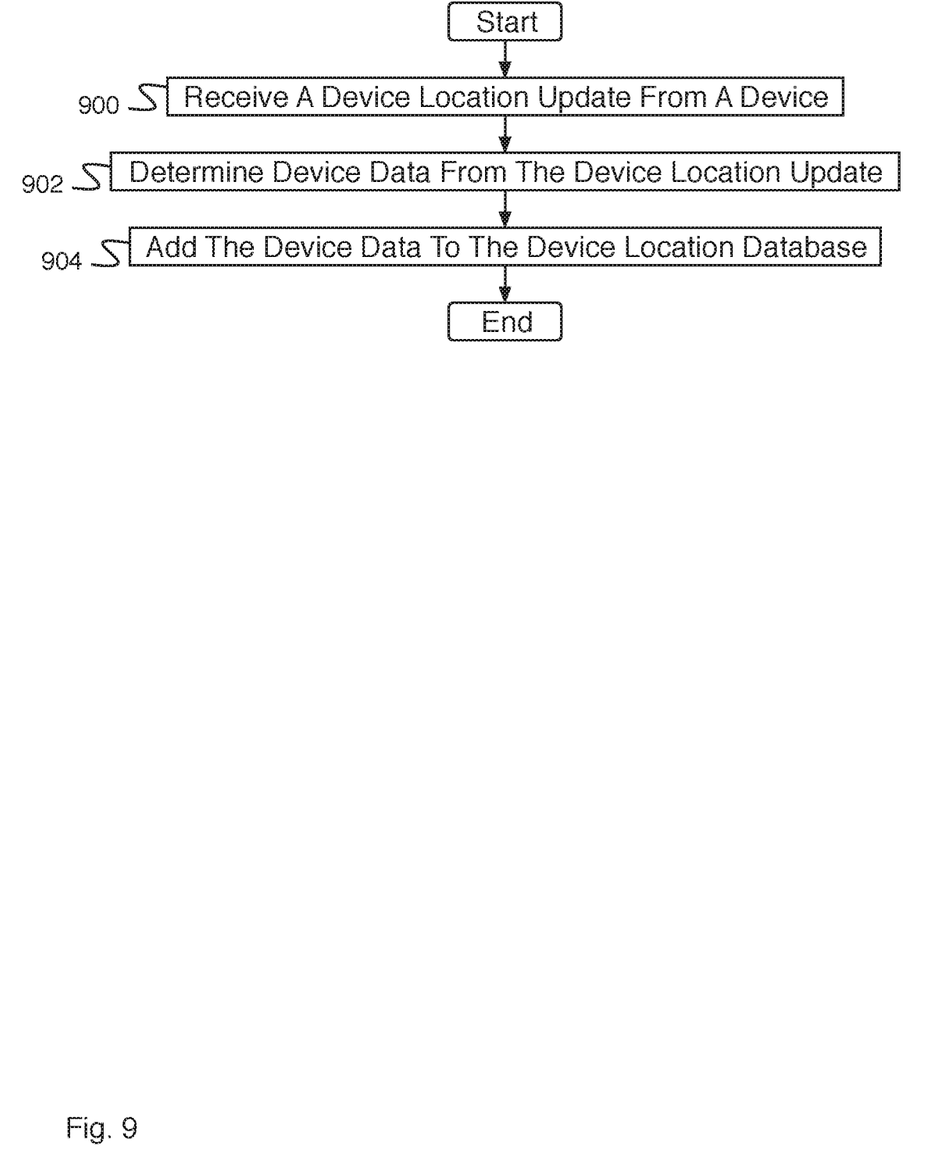
FIG. 9 is a flow diagram illustrating an embodiment of a process for updating a device database.

FIG. 9 is a flow diagram illustrating an embodiment of a process for updating a device database. In some embodiments, the process of FIG. 9 implements 700 of FIG. 7. In the example shown, in 900, a device location update is received from a device. For example, route, location, and/or time data is received from a device with a device identifier. In 902, device data is determined from the device location update. For example, device data comprises a device location (e.g., GPS coordinates), a time, and/or a device identifier. In 904, the device data is added to the device location database. For example, a set of time and location information is stored in a device database associated with the device identifier.

Figure 10:
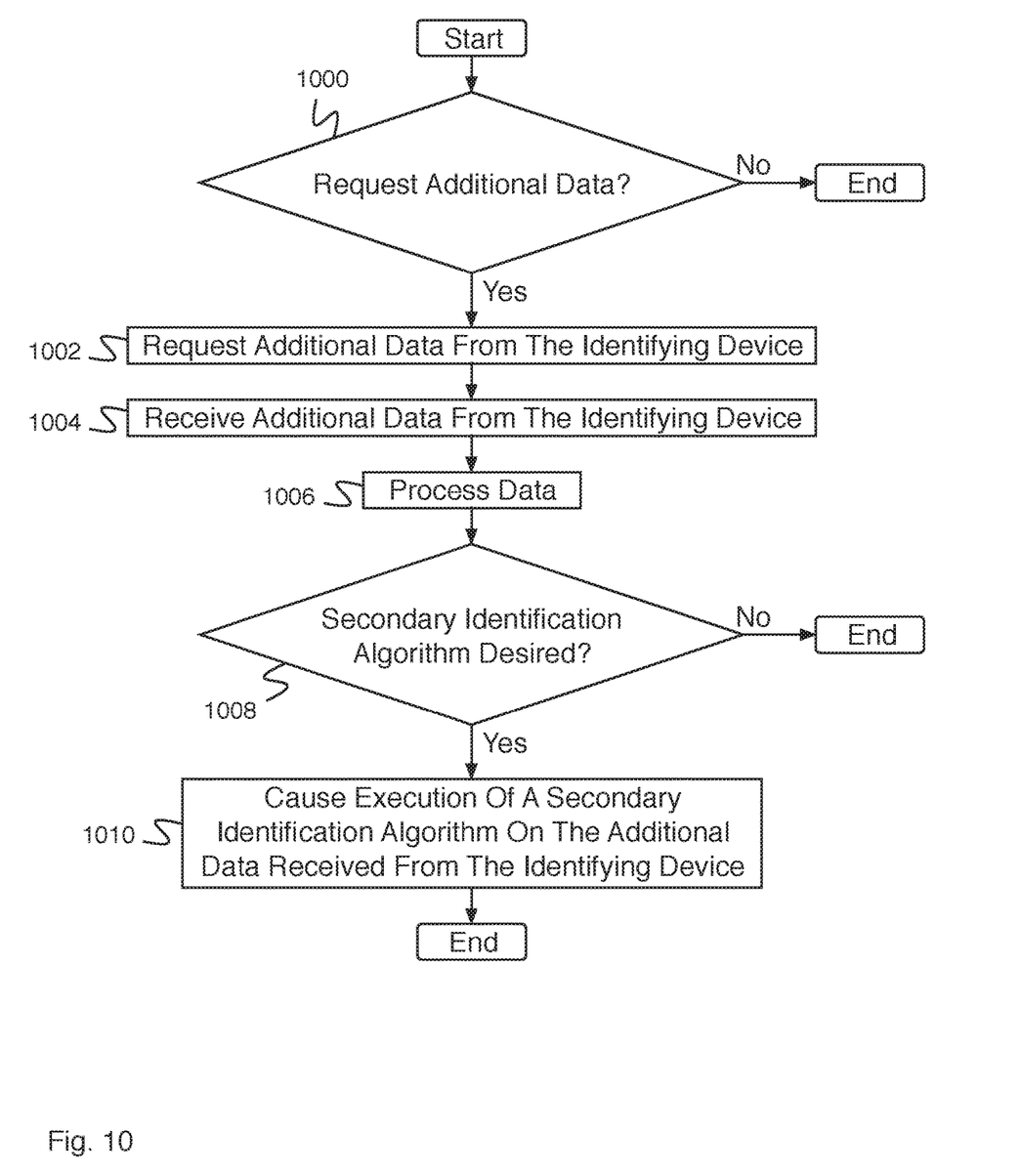
FIG. 10 is a flow diagram illustrating an embodiment of a process for requesting and processing additional data, if desired.

FIG. 10 is a flow diagram illustrating an embodiment of a process for requesting and processing additional data, if desired. In some embodiments, the process of FIG. 10 implements 712 of FIG. 7. In the example shown, in 1000, it is determined whether to request additional data. For example, determine whether the system needs or wants additional data for processing. In various embodiments, additional data comprises still image data, video data, multiple streams of video data, audio data, GPS data, accelerometer data, vehicle data, or any other appropriate data. In various embodiments, it is desired to request additional data for record-keeping, it is desired to request additional data for additional processing, it is desired to request additional data for human review, it is not desired to request additional data because an indication of detection using a detector is all the data that is required to be stored, it is not desired to request additional data because additional data was requested from a different device, or any other appropriate request for additional data. In the event it is determined not to request additional data, the process ends. In the event it is determined to request additional data, control passes to 1002. In 1002, additional data is requested from the identifying device. In 1004, additional data is received from the identifying device. In 1006, the data is processed. For example, the data is stored, filtered, up-sampled, down-sampled, sharpened, etc. In 1008, it is determined whether a secondary identification algorithm is desired. For example, a secondary identification algorithm comprises an identification algorithm for identifying additional targets, an identification algorithm for identifying multiple targets, a higher accuracy identification algorithm, etc. In the event it is determined that a secondary identification algorithm is not desired, the process ends. In the event it is determined that a secondary identification algorithm is desired, control passes to 1010. In 1010, execution of a secondary identification algorithm on the additional data received from the identifying device is caused. For example, a secondary identification algorithm is executed, a secondary identification algorithm is indicated to be executed on a networked computer or computer cluster, a secondary identification algorithm is indicated to be executed on a cloud computing system, etc.

In some embodiments, a secondary identification is run at the vehicle data center in order to verify or validate the identification made at the vehicle event recorder. In some embodiments, the secondary identification is run without requesting additional data.

Figure 11:
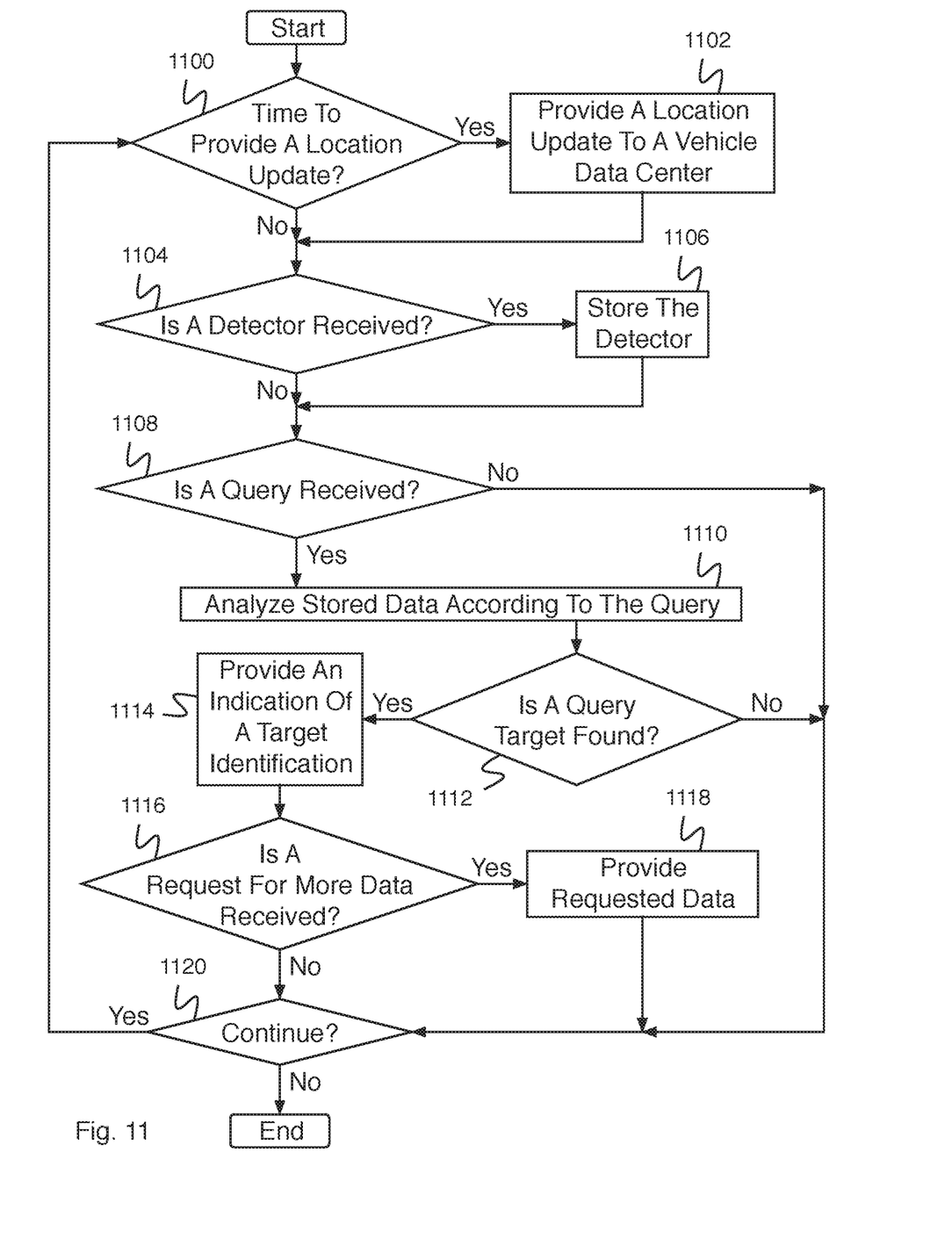
FIG. 11 is a flow diagram illustrating an embodiment of a process for a vehicle event recorder device.

FIG. 11 is a flow diagram illustrating an embodiment of a process for a vehicle event recorder device. In some embodiments, the process of FIG. 11 is executed by vehicle event recorder 102 of FIG. 1. In some embodiments, the vehicle event recorder device continually records sensor data (e.g., audio data, video data, accelerometer data, GPS data, vehicle data, etc.). In the example shown, in 1100, it is determined whether it is time to provide a location update. For example, a location update is provided once a second, once every 5 seconds, once every 10 seconds, once every 30 seconds, once every minute, once every 5 minutes, once every 10 minutes, once every hour, etc. In the event it is determined that it is not time to provide a location update, control passes to 1104. In the event it is determined that it is time to provide a location update, control passes to 1102. In 1102, a location update is provided to a vehicle data center. For example, the location update comprises location data (e.g., determined using a GPS system), time data (e.g., determined using a system clock), and vehicle identifier data (e.g., a vehicle identifier uniquely identifying the vehicle event recorder device). In 1104, it is determined whether a detector is received (e.g., received from a vehicle data center). In the event it is determined that a detector is not received, control passes to 1108. In the event it is determined that a detector is received, control passes to 1106. In 1106, the detector is stored (e.g., in a detector storage system, for future use analyzing stored data). In 1108, it is determined whether a query is received. For example, a query comprises a request to analyze a set of stored data using a stored detector to determine a target. In the event it is determined that a query is not received, control passes to 1120. In the event it is determined that a query is received, control passes to 1110. In 1110, stored data is analyzed according to the query. For example, a subset of stored data identified by the query is selected, a stored detector is selected, and the subset of stored data is analyzed using the detector to identify stored sensor data associated with the target. In 1112, it is determined whether a query target is found. For example, determining whether a query target is found comprises determining whether a detector indicates a target was found while analyzing stored data. In the event it is determined that a query target is not found, control passes to 1120. In the event it is determined that a query target is found, control passes to 1114. In 1114, an indication of a target identification is provided (e.g., to a vehicle data center). In 1116, it is determined whether a request for more data is received. For example, a request for more data comprises a request for the analyzed subset of stored data, a request for video data, audio data, sensor data, GPS data, etc. In the event it is determined that a request for more data is not received, control passes to 1120. In the event it is determined that a request for more data is received, control passes to 1118. In 1118, the requested data is provided. In 1120, it is determined whether to continue. For example, it is determined not to continue in the event the vehicle is stopped at a depot, the vehicle is powered off, the vehicle event recorder device is powered off, etc. In the event it is determined to continue, control passes to 1100. In the event it is determined not to continue, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a device database, wherein the device database stores a set of times and corresponding set of locations associated with a device;
   an interface configured to receive a request for identification of sensor data associated with a target, wherein the request includes a request time and/or a request location; and
   a processor configured to:
   determine a set of devices associated with the request time and/or the request location using the device database;
   provide a request to search for the sensor data associated with the target at the request time and/or the request location to each device of the set of devices;
   determine whether a detector associated with the target is stored on a selected device of the one or more devices of the set of devices;
   in response to a determination that the detector is not stored on the selected device, provide the detector to the selected device, wherein the selected device uses the detector to identify the sensor data associated with the target; and receive an indication of the identification of sensor data associated with the target detected using the detector on the selected device.

2. The system of claim 1, wherein the processor is further configured to determine a detector associated with the target.

3. The system of claim 2, wherein the detector is used by the identifying device to identify stored sensor data associated with the target.

4. The system of claim 2, wherein the detector comprises a detector for a vehicle, a person, a crowd, a vehicle accident, a near accident, a building, smoke, fire, panicked people, a fast food restaurant sign, or a specific-shaped vehicle.

5. The system of claim 2, wherein the detector comprises a machine learning algorithm, a neural network, a machine vision algorithm, or an artificial intelligence algorithm.

6. The system of claim 1, wherein the system for identification additionally comprises a detector database, wherein the detector database stores a list of detectors associated with a device.

7. The system of claim 6, wherein determining that the detector is not already stored on the selected device is based at least in part on the detector database.

8. The system of claim 1, wherein determining that the detector is not already stored on the selected device is based at least in part on querying the selected device.

9. The system of claim 1, wherein the time comprises a time range.

10. The system of claim 1, wherein the location comprises a location area.

11. The system of claim 10, wherein the location area comprises a geofence area, a center coordinate and radius distance, everywhere, or a named area.

12. The system of claim 1, wherein the interface is further configured to receive a device location update from a device.

13. The system of claim 12, wherein the device location update comprises a device identifier, a time, and a device location.

14. The system of claim 12, wherein the processor is further configured to add data from the device location update to the device database.

15. The system of claim 1, wherein determining a set of devices associated with the time and/or the location comprises determining whether a device is at a location that is less than a threshold distance from the request location at a time less than a threshold time from the request ti me.

16. The system of claim 1, wherein the processor is further configured to request additional data from the identifying device, wherein additional data comprises still image data, video data, audio data, sensor data, GPS data, accelerometer data, or other vehicle data.

17. The system of claim 1, wherein the selected device uses the detector to determine whether the target was found.

18. A method, comprising:
receiving a request for identification of sensor data associated with a target, wherein the request includes a request time and/or a request location;

determining, using a processor, a set of devices associated with the request time and/or the request location using a device database, wherein the device database stores a set of times and corresponding set of locations associated with a device;

providing a request to search for the sensor data associated with the target at the request time and/or the request location to each device of the set of devices;

determining whether a detector associated with the target is stored on a selected device of the one or more devices of the set of devices;

in response to a determination that the detector is not stored on the selected device, providing the detector to the selected device, wherein the selected device uses the detector to identify the sensor data associated with the target; and receiving an indication of the identification of sensor data associated with the target detected using the detector on the selected device.

19. A computer program product, the computer program product being embodied in a non-transitory computer readable storage medium and comprising computer instructions for:

receiving a request for identification of sensor data associated with a target, wherein the request includes a request time and/or a request location;

determining a set of devices associated with the request time and/or the request location using a device database, wherein the device database stores a set of times and corresponding set of locations associated with a device;

providing a request to search for the sensor data associated with the target at the request time and/or the request location to each device of the set of devices;

determining whether a detector associated with the target is stored on a selected device of the one or more devices of the set of devices;

in response to a determination that the detector is not stored on the selected device, providing the detector to the selected device, wherein the selected device uses the detector to identify the sensor data associated with the target; and receiving an indication of the identification of sensor data associated with the target detected using the detector on the selected device.

* * * * *

UNITED STATES PATENT AND TRADEMARK OFFICE
CERTIFICATE OF CORRECTION

PATENT NO. : 11,452,062 B1
APPLICATION NO. : 17/018881
DATED : September 20, 2022
INVENTOR(S) : Abraham Fisher It is certified that error appears in the above-identified patent and that said Letters Patent is hereby corrected as shown below:

In the Claims

In Column 11, Line 49, Claim 15, after "request", delete "ti me" and insert --time--, therefor.

Signed and Sealed this
First Day of August, 2023

Katherine Kelly Vidal
Director of the United States Patent and Trademark Office